United States Patent
Tsukamoto et al.

(10) Patent No.: US 10,212,612 B2
(45) Date of Patent: Feb. 19, 2019

(54) DISTRIBUTED ANTENNA SYSTEM

(71) Applicant: MITSUBISHI ELECTRIC CORPORATION, Tokyo (JP)

(72) Inventors: Kaoru Tsukamoto, Tokyo (JP); Naohiro Shinoda, Tokyo (JP); Hiroshi Nishimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/066,941

(22) PCT Filed: Mar. 25, 2016

(86) PCT No.: PCT/JP2016/059759
§ 371 (c)(1),
(2) Date: Jun. 28, 2018

(87) PCT Pub. No.: WO2017/163425
PCT Pub. Date: Sep. 28, 2017

(65) Prior Publication Data
US 2018/0376349 A1    Dec. 27, 2018

(51) Int. Cl.
*H04W 16/28* (2009.01)
*H01Q 21/08* (2006.01)
(Continued)

(52) U.S. Cl.
CPC .............. *H04W 16/28* (2013.01); *H01Q 1/32* (2013.01); *H04W 16/14* (2013.01);
(Continued)

(58) Field of Classification Search
CPC ........ H01Q 21/28; H01Q 21/08; H01Q 21/29; H01Q 21/24; H01Q 21/30; H01Q 21/06;
(Continued)

(56) References Cited

U.S. PATENT DOCUMENTS 2,904,674 A * 9/1959 Crawford ................. H04B 7/26
342/367
2007/0082672 A1    4/2007 Fujioka et al.
(Continued)

FOREIGN PATENT DOCUMENTS

JP    10-108251 A    4/1998
JP    2001-69067 A    3/2001
(Continued)

OTHER PUBLICATIONS

The Very Large Array: Current Challenges—Future Capabilities by Perley, dated Feb. 6, 2015.*
(Continued)

*Primary Examiner* — Daniel Lai
(74) *Attorney, Agent, or Firm* — Birch, Stewart, Kolasch & Birch, LLP

(57) ABSTRACT

A distributed antenna system includes a plurality of first antenna groups and a plurality of second antenna groups. The first antenna groups include a plurality of first antennas which forms beams in a first direction along a mobile station track and transmits identical signals at identical frequencies. The second antenna groups include a plurality of second antennas which forms beams in a second direction and transmits identical signals at identical frequencies. The first antennas and the second antennas are installed to face each other across the mobile station track. Each of the first antenna groups uses a frequency different from a frequency used in another first antenna group adjacent thereto, each of the second antenna groups uses a frequency different from a frequency used in another second antenna group adjacent thereto, and two frequencies are used by the first antenna groups and the second antenna groups in total.

2 Claims, 4 Drawing Sheets

(51) Int. Cl.
 *H04W 72/04* (2009.01)
 *H04W 16/14* (2009.01)
 *H01Q 1/32* (2006.01)
 *H04W 88/08* (2009.01)

(52) U.S. Cl.
 CPC ........ *H04W 72/0453* (2013.01); *H01Q 21/08* (2013.01); *H04W 88/085* (2013.01)

(58) Field of Classification Search
 CPC ....... H01Q 13/08; H01Q 15/04; H04W 16/28; H04W 24/04; H04W 88/04; H04W 88/085; H04W 40/22; H04W 24/02; H04W 16/18; H04W 16/24; H04W 92/20; H04W 16/14; H04W 72/0453
 See application file for complete search history.

(56) References Cited

U.S. PATENT DOCUMENTS

2007/0178832 A1* 8/2007 Gavrilovich ......... H04B 7/1555
 455/11.1

2015/0295328 A1* 10/2015 Fireaizen ................ H01Q 3/12
 342/370

FOREIGN PATENT DOCUMENTS

| JP | 2002-237778 A | 8/2002 |
| JP | 2006-186872 A | 7/2006 |
| WO | WO 2005/036825 A1 | 4/2005 |

OTHER PUBLICATIONS

Nishimoto et al. "A Proposal for Millimeter-wave Linear Cell Concept Enabling High-speed Land-mobile Communications", the 2015 IEICE General Conference B-5-77, Mar. 2015.
Notification of Reasons for Refusal issued in the corresponding JP Application No. 2016-549538 dated Nov. 17, 2016.

* cited by examiner

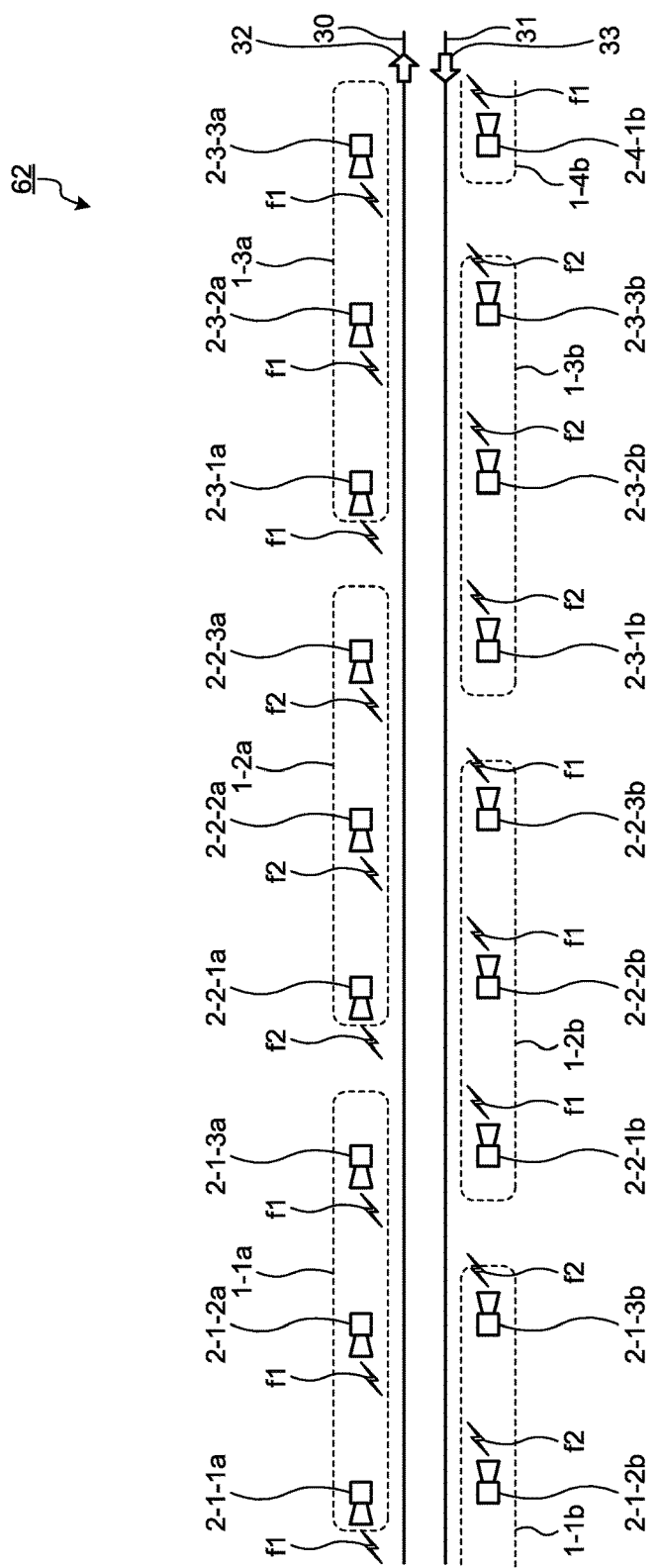

DISTRIBUTED ANTENNA SYSTEM

FIELD

The present invention relates to a distributed antenna system configured by a plurality of distributedly arranged antennas.

BACKGROUND

In a communication system assuming that a mobile station such as a train and an automobile traveling on a predetermined route performs radio communication with a base station, as described in Non Patent Literature 1, it is preferable that a base station equipped with directional antennas distributedly arranged along a traveling route of a mobile station be installed and the base station form an antenna beam along the traveling route. This makes it possible to configure an elongated cell along the traveling route, and to increase cell length while suppressing interference to other systems. A certain communication area, which is formed by transmission and reception of identical signals to and from a plurality of distributedly arranged antennas in synchronization at identical frequencies, is called a linear cell.

For example, the linear cell can be achieved in a form in which one communication modem is connected by an optical fiber or the like to a plurality of distributedly arranged antennas, or a form in which communication modems installed in antennas are synchronized with each other to have a common radio signal.

In a conventional multi-cell system including a plurality of cells, it is necessary to employ a frequency reuse factor of at least three in order to suppress inter-cell interference. On the other hand, by adopting a linear cell configuration, cell length can be increased and interference due to overreach is reduced, so that it is possible to construct a system employing a frequency reuse factor of two as indicated in Non Patent Literature 1, and frequency utilization efficiency is improved. Overreach is a phenomenon in which a signal transmitted from an antenna of a base station in a certain cell reaches a next adjacent cell beyond an adjacent cell.

CITATION LIST

Non Patent Literature

Non Patent Literature 1: Hiroshi Nishimoto, et al. "A Proposal for Millimeter-wave Linear Cell Concept Enabling High-speed Land-mobile Communications", The Institute of Electronics, Information and Communication Engineers, General Conference, B-5-77, March 2015

SUMMARY

Technical Problem

In the technique described in Non-Patent Literature 1, a case is studied where a base station is installed only on one side of a traveling route. In the configuration described in the Non-Patent Literature 1, when trains or automobiles that are mobile stations pass each other, radio waves are shielded by vehicle bodies and a mobile station which travels on a lane opposite to a lane along which the base station is installed cannot receive the radio waves from the base station, which may cause communication interruption.

The present invention has been made in view of the above, and an object thereof is to obtain a distributed antenna system capable of improving reliability of communication in a wireless communication system including a plurality of linear cells.

Solution to Problem

A distributed antenna system according to an aspect of the present invention includes a plurality of first antenna groups each of which includes a plurality of first antennas which forms beams in a first direction along a mobile station track which is a track for a mobile station and transmits identical signals at identical frequencies, and a plurality of second antenna groups each of which includes a plurality of second antennas which forms beams in a second direction opposite to the first direction and transmits identical signals at identical frequencies. The first antennas and the second antennas are installed to face each other across the mobile station tracks. Each of the first antenna groups uses a frequency different from a frequency used in another first antenna group adjacent thereto, each of the second antenna groups uses a frequency different from a frequency used in another second antenna group adjacent thereto, and two frequencies are used by the first antenna groups and the second antenna groups in total.

Advantageous Effects of Invention

According to the present invention, it is possible to achieve a distributed antenna system capable of improving reliability of communication.

BRIEF DESCRIPTION OF DRAWINGS

FIG. 4 is a diagram illustrating a configuration example of a distributed antenna system according to a third embodiment.

DESCRIPTION OF EMBODIMENTS

Hereinafter, a distributed antenna system according to each embodiment of the present invention will be described in detail with reference to the drawings. The invention is not limited to the embodiments.

First Embodiment

Figure 1:
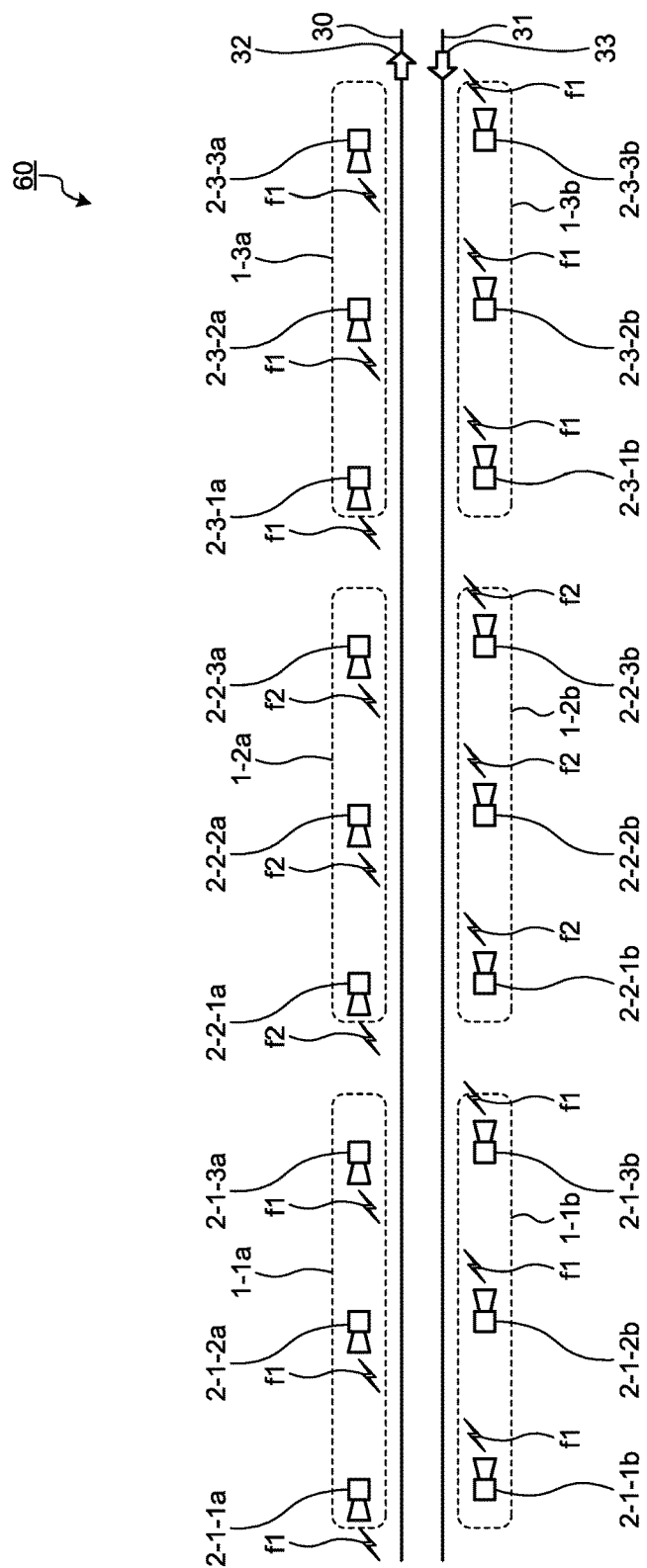
FIG. 1 is a diagram illustrating a configuration example of a distributed antenna system according to a first embodiment.

FIG. 1 is a diagram illustrating a configuration example of a distributed antenna system according to a first embodiment of the present invention. The distributed antenna system 60 according to the first embodiment forms a mobile communication system together with a base station (not illustrated). As illustrated in FIG. 1, the distributed antenna system 60 according to the first embodiment includes a plurality of antennas 2-$c$-$na$ and 2-$c$-$nb$ installed along mobile station tracks 30 and 31, which are tracks for mobile stations ($c$=1, 2, 3, . . . , $n$=1, 2, 3, . . . ). The mobile station is a radio communication device mounted on a mobile object which travels in a predetermined direction, such as a railroad vehicle or an automobile. The antennas 2-*c*-*na* and 2-*c*-*nb* are connected to a base station (not illustrated), receive a signal for a mobile station output from the base station, and transmit the signal as a radio signal. In addition, the antennas 2-*c*-*na* and 2-*c*-*nb* receive a radio signal transmitted from the mobile station to the base station, and relay the radio signal to the base station.

In the distributed antenna system 60, each of antenna groups 1-*ca* is an antenna group including a set of a plurality of consecutive antennas 2-*c*-*na*. Each of antenna groups 1-*cb* is an antenna group including a set of a plurality of consecutive antennas 2-*c*-*nb*. Here, reference character "c" indicates an antenna group index, and reference character "n" indicates an antenna index in the antenna group, and each of the "c" and the "n" is numbered 1, 2, 3, . . . , starting from the left side of FIG. 1. The reference character "n" of the antennas 2-*c*-*na* is not always need to be the same as that of and the antennas 2-*c*-*nb*.

Figure 2:
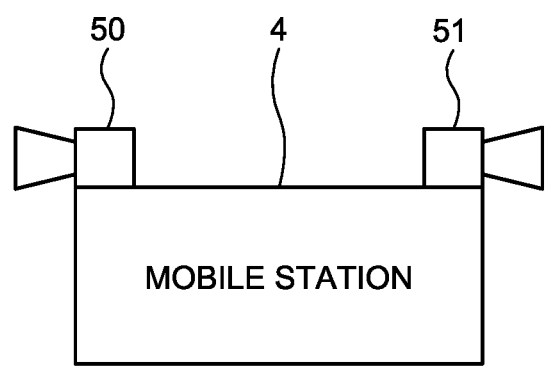
FIG. 2 is a diagram illustrating a configuration example of a mobile station according to the first embodiment.

The mobile station tracks 30 and 31 are tracks along which the mobile station 4 illustrated in FIG. 2 travels and the mobile station 4 travels in a certain direction on the mobile station track 30 or 31. Here, as an example, when traveling on the mobile station track 30, the mobile station 4 travels in the rightward direction in FIG. 1, that is, in the direction indicated by an arrow 32. When traveling on the mobile station track 31, the mobile station 4 travels in the leftward direction in FIG. 1, that is, in the direction indicated by an arrow 33.

The antennas 2-*c*-*na* are installed along the mobile station track 30. The antennas 2-*c*-*nb* are installed along the mobile station track 31. The antennas 2-*c*-*na* and 2-*c*-*nb* are directional antennas and each form a beam in a traveling direction of the mobile station 4. The antennas 2-*c*-*na* and the antennas 2-*c*-*nb* are installed so that directivities thereof are in directions opposite to each other. Here, the antennas 2-*c*-*na* each form a beam in the leftward direction in FIG. 1, that is, the direction indicated by the arrow 33, and the antennas 2-*c*-*nb* each form a beam in the rightward direction in FIG. 1, that is, the direction indicated by the arrow 32. The antenna 2-*c*-*na* and the antenna 2-*c*-*nb*, which have a common antenna group index c and a common antenna index n in the antenna group are installed at positions facing each other across the mobile station tracks 30 and 31. Here, the positions facing each other are positions where a straight line connecting the installation position of the antenna 2-*c*-*na* and the installation position of the antenna 2-*c*-*nb* is orthogonal to the mobile station tracks 30 and 31, that is, the same positions across the mobile station tracks 30 and 31 in a direction parallel to the mobile station tracks 30 and 31.

The antennas 2-*c*-*na* in each antenna group 1-*ca* are connected to one modulator included in a base station (not illustrated) via signal lines (not illustrated). Similarly, the antennas 2-*c*-*nb* in the antenna group 1-*cb* are connected via signal lines (not illustrated) to one modulator (not illustrated) different from the modulator to which the antennas 2-*c*-*na* are connected, or to output ports of the modulator to which the antennas 2-*c*-*na* are connected, the output ports being different from output ports to which the antennas 2-*c*-*na* are connected. Here, regarding the signal line connecting the modulator and each antenna, any medium may be employed as long as the signal line is a wired cable capable of transmitting a signal such as a coaxial cable and an optical fiber.

The antennas 2-*c*-*na* belonging to the same antenna group transmit identical signals Sa at identical frequencies to form one line-shaped cell. That is, one line-shaped cell is formed by the antennas 2-*c*-*na* belonging to one antenna group 1-*ca*. The line-shaped cells are also called linear cells. The antennas 2-*c*-*nb* belonging to the same antenna group transmit identical signals Sb at the same frequency as the frequency of the signals transmitted from the antennas 2-*c*-*na* to form one line-shaped cell, the antennas 2-*c*-*na* having the same antenna group index as that of the antennas 2-*c*-*nb*. That is, one line-shaped cell is formed by the antennas 2-*c*-*nb* belonging to one antenna group 1-*cb*. The signals Sa and the signals Sb respectively transmitted by the antennas 2-*c*-*na* and the antennas 2-*c*-*nb*, which have the same antenna group index c are identical signals (Sa=Sb).

Different frequencies are used by antenna groups adjacent to each other, identical frequencies are used by an antenna group and a next adjacent antenna group, that is, by neighboring antenna groups interposing one antenna group therebetween, and a frequency reuse factor is two. For example, when transmission frequencies used by antennas 2-1-*na* belonging to an antenna group 1-1*a* and antennas 2-1-*nb* belonging to an antenna group 1-1*b* are represented as f1, transmission frequencies used by antennas 2-2-*na* belonging to an antenna group 1-2*a* and antennas 2-2-*nb* belonging to an antenna group 1-2*b* are represented as f2 ($\neq$f1), and transmission frequencies of antennas 2-3-*na* belonging to an antenna group 1-3*a* and antennas 2-3-*nb* belonging to an antenna group 1-3*b* are f1.

The mobile station 4 includes antennas 50 and 51, which are directional antennas. One of the antennas 50 and 51 forms a beam in a traveling direction of the mobile station 4. The other of the antennas 50 and 51 forms a beam in a direction the reverse of the traveling direction of the mobile station 4. That is, the direction in which the antenna 50 forms a beam and the direction in which the antenna 51 forms a beam are opposite to each other. Here, the antenna 50 forms a beam in the leftward direction in FIG. 1, that is, the direction indicated by the arrow 33, and the antenna 51 forms a beam in the rightward direction in FIG. 1, that is, the direction indicated by the arrow 32. That is, the antenna 50 of the mobile station 4 can receive radio waves from the antennas 2-*c*-*nb*, and the antenna 51 can receive radio waves from the antennas 2-*c*-*na*. Here, the antennas 2-*c*-*na*, 2-*c*-*nb*, 50, and 51 are directional antennas with a narrow beam width, and influence of radio waves from antennas other than directly facing antennas, that is, reflected waves, is negligible.

Here, when there is no other mobile station which travels on the mobile station track opposite to the mobile station track on which the mobile station 4 travels, and passes the mobile station 4, the mobile station 4 can communicate with both of the antennas 2-*c*-*na* and 2-*c*-*nb*. That is, when there is no other mobile station which passes the mobile station 4, the antenna 50 of the mobile station 4 can communicate with the antennas 2-*c*-*nb*, and the antenna 51 thereof can communicate with the antennas 2-*c*-*na*. On the other hand, when there is another mobile station which passes the mobile station 4, radio waves from antennas installed on a side of the mobile station track opposite to the mobile station track on which the mobile station 4 travels are shielded by the other mobile station which travels on the opposite mobile station track, and consequently, communication is interrupted. However, because radio waves from antennas installed on a side of the mobile station track on which the mobile station 4 travels are not shielded, the communication can be continued. As an example, when the mobile station 4 travels on the mobile station track 30 in the direction indicated by the arrow 32 and passes another mobile station which travels on the mobile station track 31, radio waves from the antennas 2-*c-nb* are shielded by the other mobile station, and consequently, the radio waves cannot be received by the antenna 50, and the communication is interrupted. On the other hand, radio waves from the antennas 2-*c-na* can be received by the antenna 51, and the communication is possible.

Therefore, regarding highly reliable data such as a control signal for which instantaneous interruption of communication is not permitted, identical pieces of data are transmitted from the antennas 2-*c-na* and 2-*c-nb* and the data which is correctly received by the mobile station side can be selected, and thereby it is possible to reduce or prevent the instantaneous interruption of communication when the mobile stations pass each other.

As described above, the distributed antenna system according to the present embodiment employs the configuration in which sets of two antennas having directivity directions opposite to each other are distributedly arranged along the mobile station tracks, and antennas having the same directivity direction are installed on the same side of the mobile station tracks. In the configuration, one antenna group is formed by a plurality of consecutive antennas, and antennas in the same antenna group transmit identical signals at identical frequencies to form a linear cell. In the configuration, antenna groups which face each other across the mobile station tracks use identical frequencies and transmit identical signals. In addition, a two-frequency reuse configuration is employed in which transmission frequencies used by antenna groups adjacent to each other are set to be different frequencies. As a result, instantaneous interruption of communication does not occur when the mobile stations pass each other, and the reliability of communication can be improved.

Regarding data for which instantaneous interruption of communication is permitted but large-capacity transmission is required, such as moving image data, different data may be transmitted from the antennas 2-*c-na* and 2-*c-nb*. By setting different transmission data for each directivity direction, it is possible to double a transmission speed as compared with a case where the antennas are installed only on one side of the mobile station tracks.

Radio waves radiated from antennas with different directivity directions may be radio waves whose polarization planes are orthogonal to each other. As an example, radio waves radiated by the antennas 2-*c-na* may be vertically polarized waves and radio waves radiated by the antennas 2-*c-nb* may be horizontally polarized waves. At that time, regarding the polarization planes of the antennas included in the mobile station 4, the antenna 50 radiates horizontally polarized waves and the antenna 51 radiates vertically polarized waves. The combination of the polarizations is not limited thereto, and any combinations may be used as long as the orthogonality can be achieved. A combination of a vertically polarized antenna tilted to the right by 45° and a vertically polarized antenna tilted to the left by 45° may be employed, or a combination of a right-hand circularly polarized antenna and a left-hand circularly polarized antenna may be employed.

It is possible to reduce interference between identical frequencies that are used by antennas with different directivity directions by orthogonalizing polarization planes of radio waves radiated from two sets of antennas with different directivity directions, and consequently, communication quality can be improved.

In the description of FIG. 1, for the sake of simplicity, the number of antennas 2-*c-na* belonging to each antenna group 1-*ca* and the number of antennas 2-*c-nb* belonging to each antenna group 1-*cb* are three. However, there is no limitation thereto, and the numbers may be an arbitrary integer of 2 or more.

Second Embodiment

Figure 3:
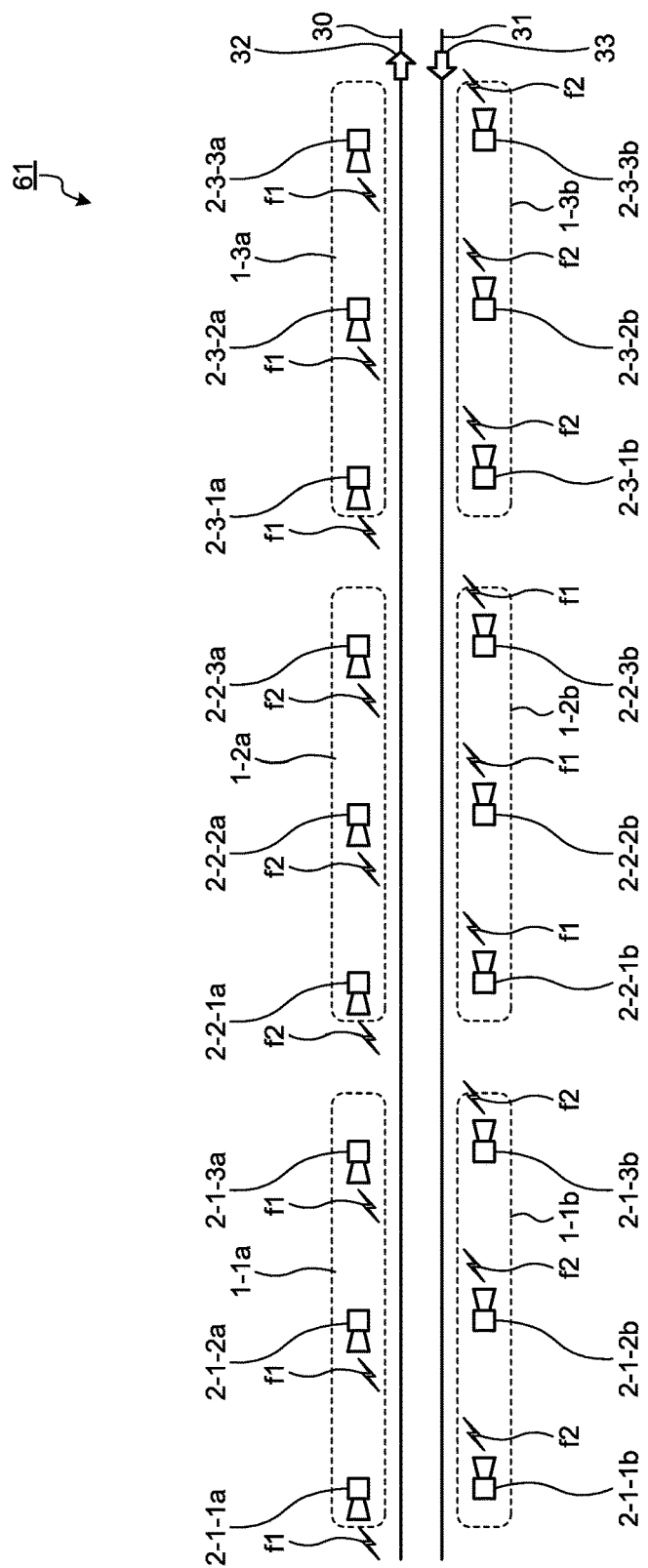
FIG. 3 is a diagram illustrating a configuration example of a distributed antenna system according to a second embodiment.

FIG. 3 is a diagram illustrating a configuration example of a distributed antenna system according to a second embodiment of the present invention. The distributed antenna system 61 according to the second embodiment is obtained by changing the transmission frequencies used by the antennas 2-*c-nb* belonging to the antenna group 1-*cb* included in the distributed antenna system 60 illustrated in FIG. 1 described in the first embodiment. In the present embodiment, parts different from the parts in the first embodiment will be described, and descriptions of the same parts as the parts in the first embodiment will be omitted.

In the distributed antenna system 61 according to the present embodiment, signals of different frequencies are transmitted from antennas having different directivity directions whose antenna group index c are the same values. That is, the transmission frequency used by the antennas 2-*c-na* and the transmission frequency used by the antennas 2-*c-nb* are set to be different values. When the transmission frequency used by the antennas 2-1-*na* belonging to the antenna group 1-1*a* is represented as f1, as an example, the transmission frequency used by the antennas 2-1-*nb* belonging to the antenna group 1-1*b* and the transmission frequency used by the antennas 2-2-*na* belonging to the antenna group 1-2*a* are represented as f2 ($\neq$f1). The transmission frequency used by the antennas 2-2-*nb* belonging to the antenna group 1-2*b* is f1.

As described above, in the distributed antenna system according to the present embodiment, the transmission frequencies used by two antennas installed across the mobile station tracks are set to be different values to each other, in contrast to the configuration of the first embodiment. As a result, an area where interference between identical frequencies may occur can be limited only to boundaries of linear cells instead of the whole area along the railroad, which makes it possible to improve communication quality as compared with the first embodiment.

Third Embodiment

FIG. 4 is a diagram illustrating a configuration example of a distributed antenna system according to a third embodiment of the present invention. The distributed antenna system 62 according to the third embodiment is obtained by changing positions of boundaries of the antenna groups 1-*cb* of the distributed antenna system 61 illustrated in FIG. 3 described in the second embodiment. In the present embodiment, parts different from the parts in the second embodiment will be described, and descriptions of the same parts as the parts in the second embodiment will be omitted.

In the second embodiment, the antennas 2-*c-na* and 2-*c-nb* are installed so that antennas which have the same values for both the antenna group index c and the antenna index n in the antenna group, face to each other across the mobile station tracks. In the present embodiment, however, the installation positions of these two antennas are displaced from each other by a distance corresponding to an installation position for one antenna. At that time, among antennas 2-*c-na* belonging to each antenna group 1-*ca*, an antenna 2-*c*-Na at an end in a direction opposite to the directivity direction thereof, and among antennas 2-(*c*+1)-*nb* belonging to each antenna group 1-(*c*+1)*b*, an antenna 2-(*c*+1)-1*b* at an end in a direction opposite to the directivity direction thereof are installed to face to each other across the mobile station tracks. Here, N is the number of antennas 2-*c*-*na* in the antenna group 1-*ca*, and N=3 in FIG. 4. The number of antennas 2-*c*-*nb* in the antenna group 1-*cb* is N, as well. As an example, the antenna 2-1-3*a* and the antenna 2-2-1*b* are installed to face to each other across the mobile station tracks. At that time, the antennas 2-1-*na* and the antennas 2-1-(*n*+1)*b* (in which n=1, 2 (=N−1)) are installed to face to each other across the mobile station tracks.

As described above, in the distributed antenna system according to the present embodiment, each of the antennas that are installed on one side of the mobile station tracks are displaced by a distance corresponding an installation position for one antenna, in contrast to the configuration of the second embodiment. This makes it possible to set the frequency of radio waves coming from the front of the mobile station and the frequency of radio waves coming from the back of the mobile station to be different values in the whole area along the railroad, so the possibility of occurrence of interference between identical frequencies decreases in the whole area along the railroad, and the communication quality can be further improved as compared with the communication quality in the second embodiment.

In each of the embodiments, the case has been described in which the numbers of antennas belonging to antenna groups are the same, but there is no limitation thereto. The numbers of antennas belonging to antenna groups may be different for each antenna group.

The configuration described in the embodiments above indicates one example of the content of the present invention and can be combined with other known technology, and a part thereof can be omitted or modified without departing from the gist of the present invention.

REFERENCE SIGNS LIST 1-1*a* to 1-3*a*, 1-1*b* to 1-4*b* antenna group; 2-1-1*a* to 2-3-3*a*, 2-1-1*b* to 2-3-3*b*, 2-4-1*b*, 50, 51 antenna; 30, mobile station track; 4 mobile station; 60 to 62 distributed antenna system.

The invention claimed is:

1. A distributed antenna system comprising:
a plurality of first antenna groups each of which includes a plurality of first antennas to form beams in a first direction along a mobile station track that is a track for a mobile station and to transmit identical signals at identical frequencies; and
a plurality of second antenna groups each of which includes a plurality of second antennas to form beams in a second direction opposite to the first direction and to transmit identical signals at identical frequencies, wherein
the first antennas and the second antennas are installed to face each other across the mobile station track,
each of the first antenna groups uses a frequency different from a frequency used in another first antenna group adjacent thereto,
each of the second antenna groups uses a frequency different from a frequency used in another second antenna group adjacent thereto,
two frequencies are used by the first antenna groups and the second antenna groups in total,
the first antennas and the second antennas are each installed such that one of the first antennas and corresponding one of the second antennas are located at same positions in a direction parallel to the mobile station track, across the mobile station track, and
the first antenna groups and the second antenna groups are formed such that a first antenna located at an end portion of each of the first antenna groups in the second direction and a second antenna located at an end portion of the second antenna group in the first direction are installed at same positions in a direction parallel to the mobile station track, across the mobile station track, and use identical frequencies.

2. The distributed antenna system according to claim 1, wherein
the first antenna other than the first antenna located at the end portion of the first antenna group in the second direction transmit same signals as signals transmitted by the second antenna installed to be located at the same positions in a direction parallel to the mobile station track, across the mobile station track during reliable data transmission, and
the first antennas other than the first antenna located at the end portion of the first antenna group in the second direction, transmit signals different from signals transmitted by the second antennas installed to be located at the same positions in a direction parallel to the mobile station track, across the mobile station track, during large-capacity data transmission.

* * * * *